(12) United States Patent
Bosch et al.

(10) Patent No.: US 9,173,201 B2
(45) Date of Patent: Oct. 27, 2015

(54) METHOD AND BASE STATION SYSTEM FOR PROVIDING ACCESS TO A MOBILE COMMUNICATION NETWORK

(75) Inventors: Peter Bosch, Aalsmeer (NL); Sape Mullender, Amsterdam (NL)

(73) Assignee: Alcatel Lucent, Boulogne-Billancourt (FR)

( * ) Notice: Subject to any disclaimer, the term of this patent is extended or adjusted under 35 U.S.C. 154(b) by 70 days.

(21) Appl. No.: 13/876,065

(22) PCT Filed: Sep. 21, 2011

(86) PCT No.: PCT/EP2011/066455
§ 371 (c)(1),
(2), (4) Date: Mar. 26, 2013

(87) PCT Pub. No.: WO2012/041755
PCT Pub. Date: Apr. 5, 2012

(65) Prior Publication Data
US 2013/0183991 A1    Jul. 18, 2013

(30) Foreign Application Priority Data
Sep. 27, 2010   (EP) .................................... 10306037

(51) Int. Cl.
*H04W 72/04*    (2009.01)
*H04W 8/26*    (2009.01)
(Continued)

(52) U.S. Cl.
CPC .......... *H04W 72/04* (2013.01); *H04W 72/0486* (2013.01); *H04W 8/26* (2013.01); *H04W 48/12* (2013.01); *H04W 48/18* (2013.01)

(58) Field of Classification Search
CPC . H04W 72/04; H04W 72/0486; H04W 48/18; H04W 8/26
USPC .................. 455/410, 442, 450; 713/150, 168; 709/223, 238, 225
See application file for complete search history.

(56) References Cited

U.S. PATENT DOCUMENTS

| 6,519,456 B2 | 2/2003 | Antonio et al. |
| 7,860,978 B2 | 12/2010 | Oba et al. |

(Continued)

FOREIGN PATENT DOCUMENTS

| CN | 101322346 A1 | 12/2008 |
| JP | 2007-519379 | 7/2007 |
| WO | WO 2007/064822 A2 | 6/2007 |

OTHER PUBLICATIONS

Notice of Reason for Refusal for corresponding Japanese Patent Application No. 2013-529643, dated Feb. 6, 2014, 8 pages.
Notice of Preliminary Rejection or corresponding Korean Patent Application No. 10-2013-7009633, dated Mar. 31, 2014, 9 pages.

(Continued)

*Primary Examiner* — Nathan Taylor
(74) *Attorney, Agent, or Firm* — Fay Sharpe LLP

(57) ABSTRACT

The invention pertains to a method for providing access to a mobile communication network comprising at least one base transceiver station, wherein the communication network is being visited by a piece of user equipment having a home operator in a home network. The method comprises at the base transceiver station: receiving a channel request from said user equipment, creating a virtual machine associated with said home operator of said user equipment, establishing a channel using said virtual machine, and allocating channel resources of said at least one base station to accommodate said channel. The invention also pertains to a base station system to carry out the method of the invention.

8 Claims, 6 Drawing Sheets

(51) Int. Cl.
*H04W 48/18* (2009.01)
*H04W 48/12* (2009.01)

(56) References Cited

U.S. PATENT DOCUMENTS

2002/0098842 A1* 7/2002 Antonio et al. ............... 455/442
2007/0130456 A1* 6/2007 Kuo et al. ..................... 713/150
2009/0170472 A1* 7/2009 Chapin et al. ................. 455/410

OTHER PUBLICATIONS

Steve Muir, "Shared Active Infrastructure and the Virtualization of Wireless Networks," Wireless Design & Development, 6 pages, XP002621531, Sep. 2, 2011.
Gautam Bhanage et al., "Virtual Basestation: Architecture for an Open Shared WiMAX Framework," pp. 1-8, XP002621532, Feb. 8, 2011.
International Search Report for PCT/EP2011/066455 dated Dec. 9, 2011.

* cited by examiner

METHOD AND BASE STATION SYSTEM FOR PROVIDING ACCESS TO A MOBILE COMMUNICATION NETWORK

FIELD OF INVENTION

The present invention relates to mobile communications, and more particularly to a method and system for providing access to a mobile communication network in which a plurality of service providers can share a virtualized base station.

BACKGROUND

Virtualizing a base station is understood to mean opening up the base station, the associated frequency band in which it operates, the amplifiers and radios, or generally any physical aspects of the base station for use by other parties.

Among the known proposals to virtualize base stations, there are virtualizing the analog layer, operating most of the base station in cloud computer systems, and virtualizing the base station and associated radio-access network via Mobile Virtual Network Operator (MVNO)-like structures. None of these traditional approaches provide a solution that is technically simple, yet flexible enough to allow for easy integration in existing networks, and offers the possibility to develop different business opportunities.

Recently, the concept of running multiple virtual machines inside a base station, representing different virtual operators, has been proposed. However, the problem of efficiently informing user equipment of the presence and capabilities of these virtual operators has not been resolved.

SUMMARY

The question of optimally virtualizing the base station and offering the base station assets temporarily or through longer term relationships to third parties, for those parties to use the (virtualized) base station as if the asset were owned by the virtual provider, has remained an unsolved problem to date. This problem is resolved by combination of features recited in independent claims 1 and 8. Embodiments of the present invention virtualize a base station by enabling multiple virtual operators to offer their services at the physical channel layer inside a cellular base station.

According to an aspect of the present invention, there is provided a method for providing access to a mobile communication network comprising at least one base transceiver station, said communication network being visited by a user equipment having a home operator in a home network, the method comprising at said at least one base transceiver station: receiving a channel request from said user equipment; creating a virtual machine associated with said home operator of said user equipment; establishing a channel using said virtual machine; and allocating channel resources of said at least one base station to accommodate said channel.

It is an advantage of the present invention that a base station can be shared between multiple virtual operators, to make better use of the scarce spectral resources without resorting to roaming. The virtual operator service provider retains control over the data transmitted over the virtual channel, while taking maximal advantage of the radio transmission related services offered by the base transceiver station owner.

It is a further advantage of this embodiment that virtualization of the physical layer can be avoided, which follows the insight that physical layer virtualization does not lead to an increase in efficiency. The logical layers maintained by the base station are virtualized, which includes all of the logical channel structures. The logical broadcast channel may be virtualized or left intact.

In an embodiment, the method of the present invention further comprises at said at least one base station: broadcasting over a broadcast control channel a plurality of identifications of virtual operator services provided by respective virtual operator service providers, and connection instructions pertaining to said virtual operator services; wherein said channel request pertains to a selected one of said virtual operator service providers corresponding to said home operator of said user equipment.

It is an advantage of this embodiment that appropriate user equipment may be used to select the services of the home operator from among various operators sharing the same physical resources (such as a frequency sub-band).

In an embodiment of the method of the present invention, the allocating of channel resources comprises at said at least one base transceiver station: relaying said channel request to the home operator; and receiving a resource request from said home operator.

It is an advantage of this embodiment that the virtual operator service provider (i.e., the home operator) can control the allocation of resources, so as to offer differentiated services to its subscribers. The virtual operator service provider and the base transceiver station owner who controls the spectrum may thus negotiate for example price, duration, and allowable power level for the channel to be set up.

In a particular embodiment of the method of the present invention, said allocating of channel resources comprises at said at least one base transceiver station: verifying if sufficient resources are available at said at least one base transceiver station to accommodate said resource request; and allocating resources in accordance with said resource request if said sufficient resources are available.

It is an advantage of this embodiment that different levels of service may be negotiated between the owner of the base transceiver station and the virtual service provider in function of the availability of resources.

In an embodiment, the method of the present invention further comprises at said at least one base transceiver station: broadcasting primary and secondary common pilot channels, a primary common control physical channel, and a synchronization channel.

It is an advantage of this embodiment that the base transceiver station provides the basic channels to enable a user equipment to synchronize, to decode the broadcast transport channel and the logical channel modulated thereon, while allowing a virtualization of all other communication channels required by the applicable protocol.

In an embodiment of the method of the present invention, said request comprises an uplink dedicated control channel message, received over a Reverse Access Channel.

In an embodiment of the method of the present invention, said at least one base transceiver station comprises a computation platform adapted to host a plurality of virtual machines, each of which is dedicated to a virtualized home operator, said virtual machines being operatively connected to communication functions provided by said at least one base transceiver station; the method further comprising at said at least one base transceiver station: verifying if a virtual machine instance corresponding to the selected virtual operator service is present on said computation platform; instantiating a virtual machine instance if the result of said verifying is negative; allocating base station resources to said virtual machine instance; and exchanging communication data with said home operator and exchanging wireless transmission comprising said communication data with said user equipment; wherein said allocating of channel resources and said exchanging communication data takes place through said virtual machine instance, using resources from among said allocated base station resources.

The present invention further relates to a base station system for providing access to a mobile communication network, said base station system comprising: a receiving unit adapted to receive a channel request from a user equipment to establish a channel; a resource allocating module adapted to allocate channel resources of said base station to a selected virtual operator service to accommodate said channel; a service provider interface adapted to exchange communication data with said selected virtual operator service; an air interface adapted to exchange wireless transmissions comprising said communication data with said user equipment; and a computing platform adapted to instantiate a plurality of virtual machines; wherein said resources comprise resources of a virtual machine instance instantiated in said computing platform, said virtual machine instance being associated with said selected virtual operator service.

In an embodiment of the base station system of the present invention, said channel request comprises a user equipment identification, and said base station system is adapted to select said selected virtual operator service on the basis of said user equipment identification.

In an embodiment, the base station system of the present invention further comprises a broadcast control channel transmission unit adapted to broadcast a plurality of identifications of virtual operator services provided by respective virtual operator service providers, and connection instructions pertaining to said virtual operator services; wherein said channel request comprises an identification of said selected virtual operator service from among said virtual operator services.

In an embodiment, the base station system of the present invention further comprises a resource negotiation agent, adapted to relay said channel request to the virtual operator service provider corresponding to said selected virtual operator service and to receive a resource request from said virtual operator service provider.

The advantages of the various embodiments of the base station system according to the present invention generally correspond to those of the corresponding embodiments of the method according to the present invention.

BRIEF DESCRIPTION OF THE FIGURES

Some embodiments of apparatus and/or methods in accordance with embodiments of the present invention are now described, by way of example only, and with reference to the accompanying drawings, in which.

Throughout the figures, like elements are indicated by like reference signs.

DESCRIPTION OF EMBODIMENTS

Hereinafter, four fundamental roles in cellular communication protocols will be defined as follows: (a) a Radio Access Network (RAN) owner that owns the base transceiver stations, Radio Network Controllers (RNCs) and licensed spectrum, (b) the home operator interested in providing virtual service wherever their (roaming) users reside, (c) the roaming user itself with its User Equipment (UE) roaming into the RAN owner's network and requests service from the home operator, and (d) a virtualized protocol stack from the home operator that needs to be deployed in the RAN owner's infrastructure. Where the description attributes certain operations to subscribers, operators, equipment owners and the like, it shall be understood that such operations are technically performed by the appropriate equipment via appropriate network connections.

Figure 1:
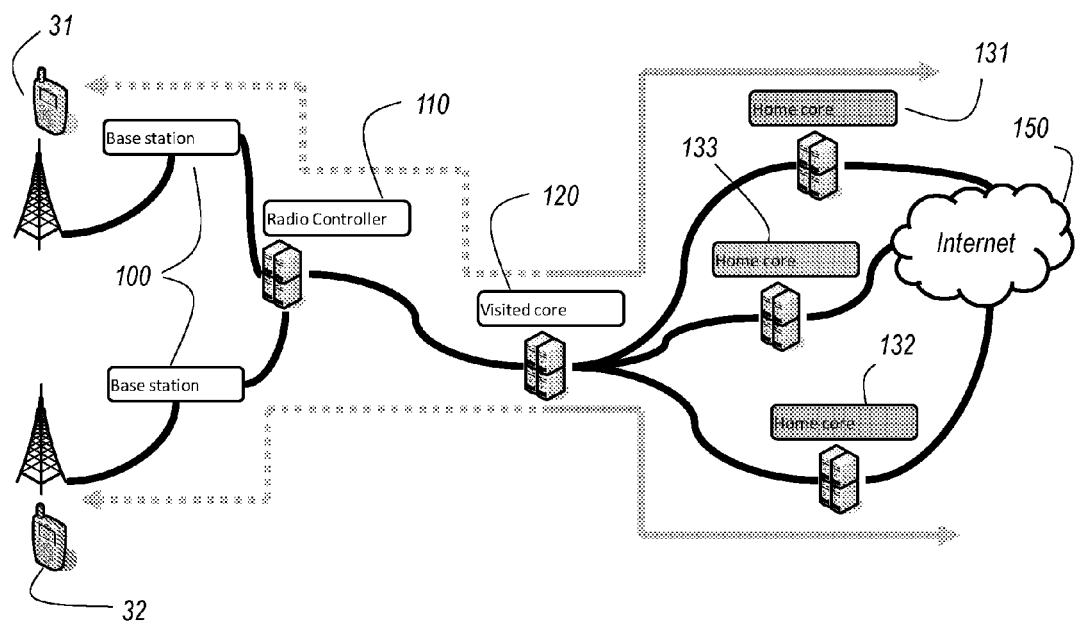
FIG. 1 illustrates a mobile network with base stations providing traditional roaming functionality.

FIG. 1 schematically illustrates a mobile network comprising base stations 100, controlled by a common radio controller 110, connected to a core router 120, serving the visited network. Without loss of generality, only two pieces of user equipment 31, 32 are illustrated, in communication with two base stations 100. In the scenario illustrated in FIG. 1, it is assumed that the different pieces of user equipment 31, 32, belonging to roaming users, are visiting the network served by the base stations 100, and use the services of their respective home operator's networks 131, 132 via roaming, in order to access circuit-switched communication services, the internet, or another suitable network. This roaming access implies that the base stations 100 provide a channel operated by the owner of the visited network, which is routed from the visited core router 120 to the appropriate home core router 131, 132 via respective network tunnels.

A piece of user equipment 31, 32 will attempt to access the radio network represented by the base stations 100 by checking the various sub-bands of the frequency band in which they are able to operate for the presence of a broadcast channel that identifies itself as belonging to their particular home operator 131, 132. In the absence of a sub-band dedicated to the targeted home operator 131, 132, a suitable roaming operator will be selected instead, for instance on the basis of a list of eligible roaming networks stored in the user equipment's SIM card. The base stations 100 will hereinafter be assumed to broadcast at least one broadcast channel identified as belonging to a network provider that offers roaming services to subscribers of each of the home operators 131, 132.

The link between the home operator 131, 132 of the respective roaming user 31, 32 and the base stations 100 in the visited network, is substantially a commercial agreement between the respective home operators and the RAN owner, i.e. the owner of the visited network. From a technical point of view, the respective home operators 131, 132 do not have any concrete presence in the visited network's radio network infrastructure and are therefore not able to offer differentiated services to their subscribers 31, 32 when they reside in this visited network. The actual interchange of data between the visited network and the home network takes place via appropriate tunnels, such as GTP or GRE tunnels, optionally provided by a GTP Routing Exchange.

The present invention is based on the insight that it is advantageous to virtualize a base station at the logical channel layer. Taking W-CDMA (Wideband Code Division Multiple Access) as an exemplary mobile technology, without loss of generality, virtual base stations can be described in the base station's BCCH (broadcast control channel) logical channel, such that each virtual operator has a specific field in the BCCH data structure and describes (a) that virtual service is offered and (b) how to get (virtualized) access through the virtual provider.

Figure 3:
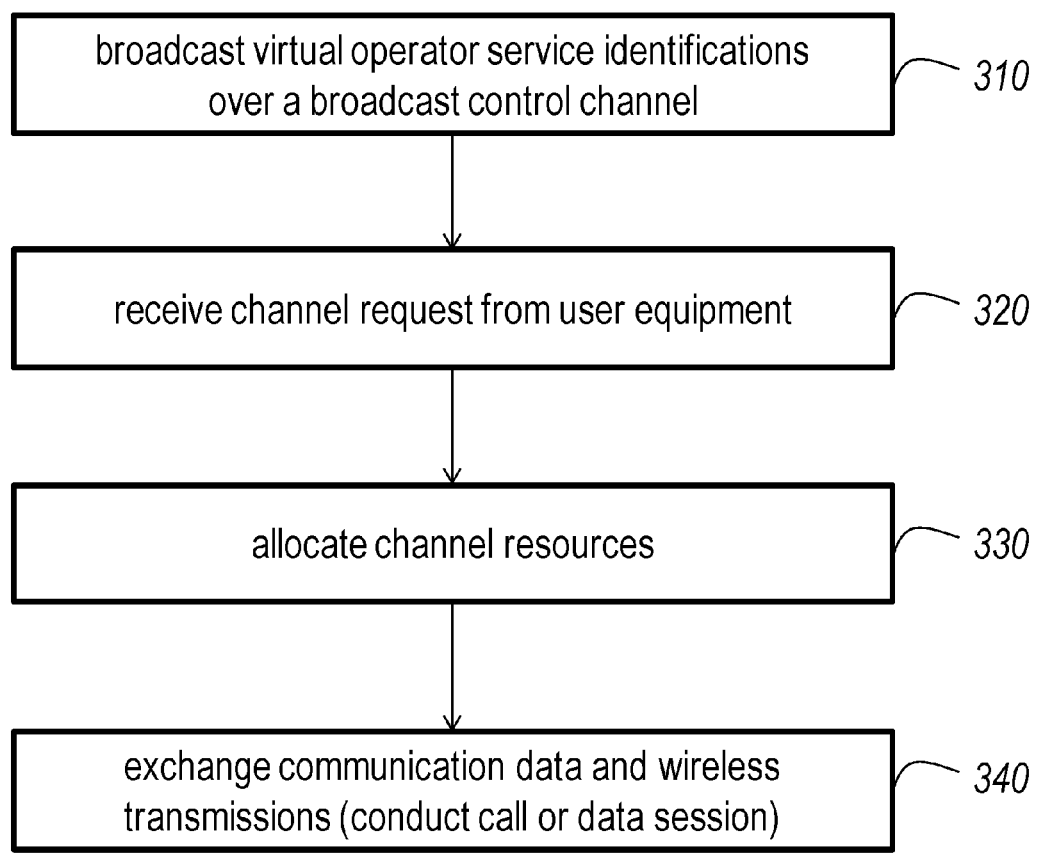
FIG. 3 is a flow chart representing an embodiment of the method of the present invention.
Figure 4:
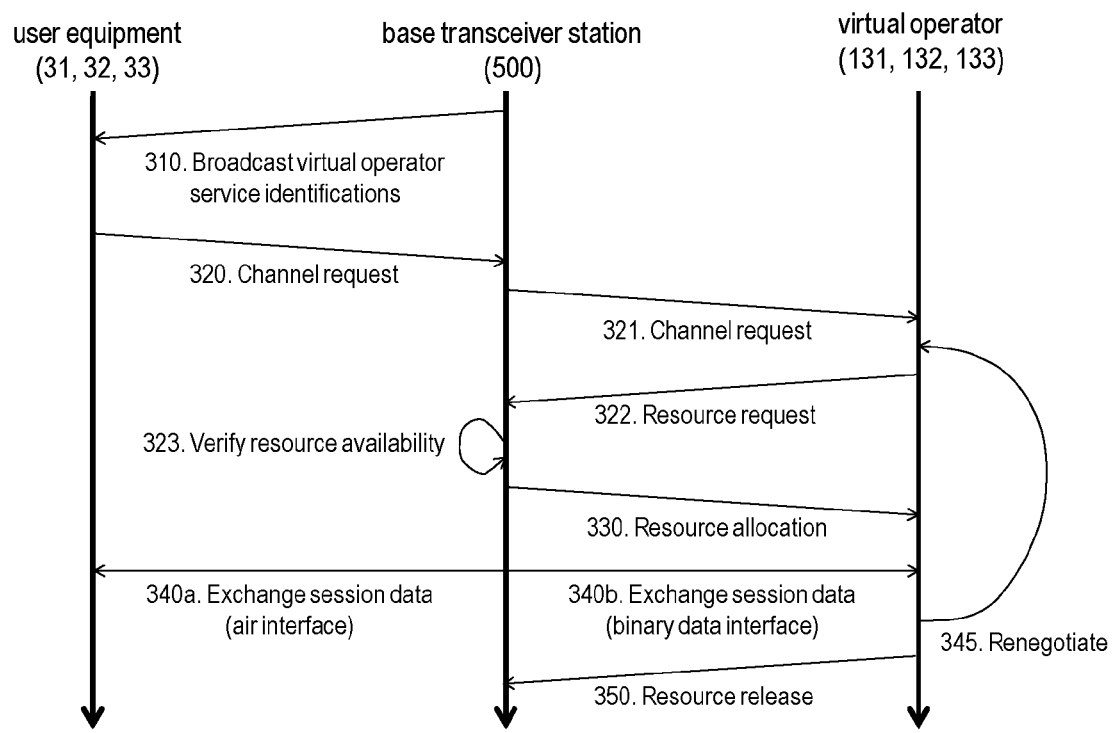
FIG. 4 is a message chart representing an embodiment of the method of the present invention.

An embodiment of the method of the present invention will now be described in more detail with reference to FIGS. 2-4. Without loss of generality, FIGS. 2-4 refer to three pieces of user equipment 31, 32, 33 and their three associated home operators acting as virtual operators 131, 132, 133. The number of users and operators is chosen arbitrarily and only serves as an example.

Figure 2:
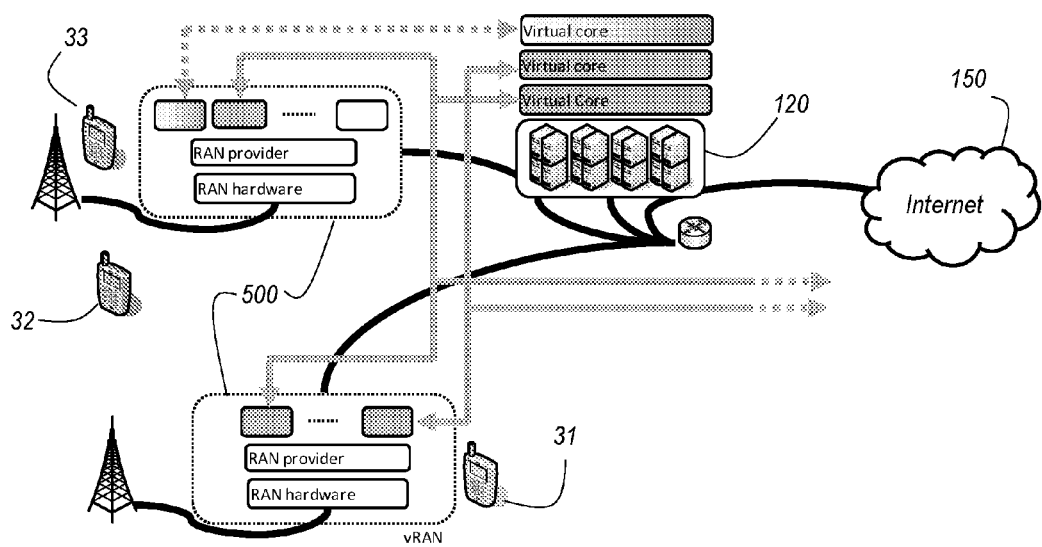
FIG. 2 illustrates a mobile network providing virtualized services according to the present invention.

FIG. 2 illustrates a mobile network similar to the one of FIG. 1, in which, again without loss of generality, three pieces of user equipment 31, 32, 33 are illustrated as visiting subscribers in a mobile network served by base stations 500.

The base stations 500 operate according to the principles of the present invention in order to provide, in a virtualized way, the local service of the respective subscriber's home network providers in the area served by base stations 500. The corresponding core network routers of the home operators acting as virtual providers 131, 132, 133 use the physical layer services of base stations 500 in order to relay communication data from a virtual core 120 residing in the network, to the roaming users' user equipment 31, 32, 33.

FIG. 2 is not intended to be limiting with respect to the precise division of responsibilities between the virtual core 120 and the resources provided by the base stations 500, or to the location of the virtual core 120. In particular, embodiments of the present invention, which will be described in more detail below, provide for the existence of a complete virtual machine operated by the virtual provider and residing at the base station 500, accessing a variety of base station functions. Other embodiments of the present invention provide a base station 500 that is solely responsible for broadcasting provider information and synchronization information to the user equipment 31, 32, 33 and for providing virtualized physical layer functionality, i.e. a reduced virtual machine, to the virtual operators 131, 132, 133. The skilled person shall appreciate that different divisions of responsibility may also be applied.

The owner of the base station 500 at minimum only provides the primary and secondary common pilot channels (CPICH), the primary common control physical channel (CPCCH) and the synchronization channel (SCH). These are the basic channels to enable a piece of user equipment 31, 32, 33 to synchronize to a base station 500, to decode the broadcast transport channel BCH and the logical channel BCCH modulated on BCH. All other channels may be operated for the virtual provider, including secondary CPCCH, dedicated physical channels DPCH, dedicated shared channels DSCH, and all uplink channels from the user equipment 31, 32, 33. Virtualization according to the invention implies that the virtualized channels are decoded by the RAN owner's base band decoders, but controlled by the home operator 131, 132, 133.

The BCCH broadcast 310 by the base transceiver station 500 is virtualized in the sense that it is shared between several virtual operators. According to embodiments of the invention, BCCH identifies for each virtual operator 131, 132, 133 a secondary CPCCH for FACH and PCH to support forward random access and paging, and describes the virtualized PRACH for reverse random access.

For a piece of user equipment 31, 32, 33 to gain access to a virtual base station 500, it first decodes the shared broadcast channel BCCH, and then selects its virtual service provider. This selection typically occurs in the context of scanning several frequency bands in order to determine the frequency band that carries the channels of a suitable operator, and is no different to today's network selection, albeit that in embodiments of the present invention, a broadcast channel is now shared among the virtual service providers 131, 132, 133 hosted on the base station 500, instead of each carrier-sector having its own broadcast channel; it then selects the (virtual) home operator's additional channels.

In an advantageous alternative embodiment, wideband radio may be used, allowing the base station to receive a network selection message from the user equipment 31, 32, 33, regardless of the used sub-band. The virtualized base station 500 looks up the appropriate band for the selected home operator, and tunes its radios to that band, in order to provide the virtual service of the selected home operator. The user equipment 31, 32, 33, is redirected to the appropriate band by means of an inter-frequency hand-over.

The second potential function of a virtualized base station 500 is to negotiate resource requests whenever a piece of user equipment 31, 32, 33 requires access. For instance, when a user equipment 31, 32, 33 transmits a control message 320 over, for instance, RACH or an uplink dedicated control channel (UL DCCH) to establish a new DPCH (dedicated physical channel) to host a regular DCH (dedicated channel), the virtual operator 131, 132, 133 needs to negotiate 321-330 with the RAN owner 500.

In embodiments of the present invention, the home operator acting as a virtual service provider 131, 132, 133 submits a request 322 for a DPCH to the physical resource owner or RAN owner 500 (i.e., the owner of the base station 500 and spectrum) and negotiates price, duration and allowable power levels for that particular channel. The RAN owner 500 optionally verifies 323 the availability of sufficient resources, and returns the applicable resources or information pertaining thereto 330, such as an OVSF spreading code, to the virtual provider 131, 132, 133 for communicating with the user equipment 31, 32, 33, and configures its physical layer to host the new channel 340. Hosting the channel 340 comprises suitably converting communication data received from the virtual provider 131, 132, 133 as required by the selected physical layer protocol, and transmitting the converted data to the user equipment 31, 32, 33 via the air interface; and converting the wireless transmissions received from the user equipment 31, 32, 33 via the air interface, into communication data to be transmitted to the virtual provider 131, 132, 133 as required by the selected physical layer protocol. The exchanges between the user equipment 31, 32, 33 and the base transceiver station 500 on the one hand, and between the base transceiver station 500 and the virtual provider 131, 132, 133 on the other hand, are designated in FIG. 4 as 340a and 340b, respectively. In the context of this invention, communication data may pertain to mobile voice telephone calls and/or mobile packet-switched data transmissions.

During the call, the virtual provider may renegotiate 345, 322-330 for additional resources such as power or shorter (or longer) OVSF spreading codes. When the channel is no longer needed, the spreading code is returned 350 to the physical base station 500.

A virtual service provider needs to provide most of a cellular protocol stack (radio access network and core network) when connected to a virtualized base station. Everything except the management of the broadcast channel can be virtualized and operate either in a virtual machine instantiated at the physical base station (thus making a virtual base station), a virtual Base Station Router, to more traditional deployments with physical Radio Network Controllers (RNCs), SGSNs, GGSNs, and MSCs, or even virtualized Radio Access Network (RAN) and virtualized core networks (CNs).

Especially the latter, when combined with virtualizable base stations allows for a completely virtual cellular operator network whereby a (virtual) cellular service provider does not need any physical element to provide cellular service. The vBSR approach has the distinct advantage that all negotiations for spreading codes and power can proceed inside the base station and no further standardization is needed to design the virtual base station principle, except for the changes to the broadcast channels in certain embodiments of the invention.

Figure 5:
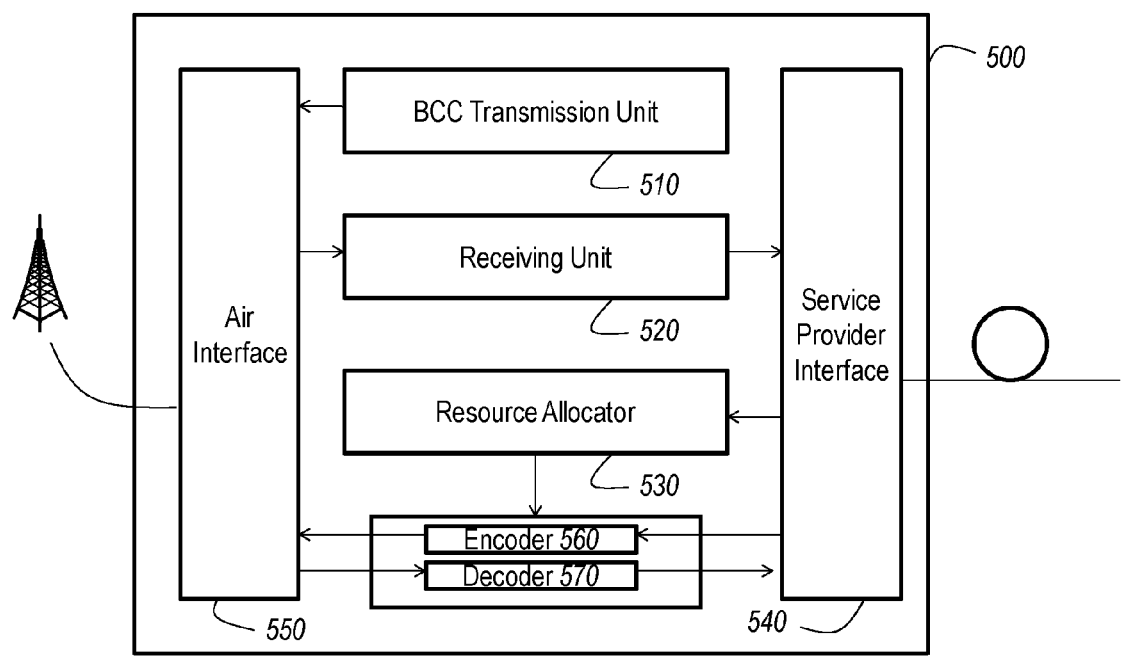
FIG. 5 is a block diagram of an embodiment of the base station system of the present invention.

FIG. 5 schematically represents a base transceiver station 500 intended to operate in a wireless network with a wireless interface (or air interface) 550 for exchanging wireless transmissions with pieces of user equipment and a service provider interface 540 for exchanging communication data with virtual provider equipment.

The base transceiver station 500 of this embodiment further comprises a BCCH transmission unit 510, adapted to broadcast a plurality of identifications of virtual operator services, provided by respective virtual operator service providers, and connection instructions pertaining to said virtual operator services. The BCCH transmission unit 510 realizes this transmission via the aforementioned air interface 550.

The base transceiver station 500 further comprises a receiving unit 520, adapted to receive a channel request from user equipment to establish a channel using a selected virtual operator service. It receives this request via the aforementioned air interface 550. The request received by the receiving unit 520 should lead to an allocation of resources by resource allocator 530, after an optional negotiation with service provider which takes places by the service provider interface 540 where applicable. The resource allocator 530 is adapted to allocate said channel resources to accommodate a requested channel.

When a channel has been set up and encoder 560 and a decoder 570 operate to exchange information pertaining to the channel between the service provider interface 540 and the air interface 550. In particular, encoder 560 and decoder 570 cooperate to provide physical layer functionality according to the selected physical layer protocol for data exchanged between the virtual operator and its subscribers.

Figure 6:
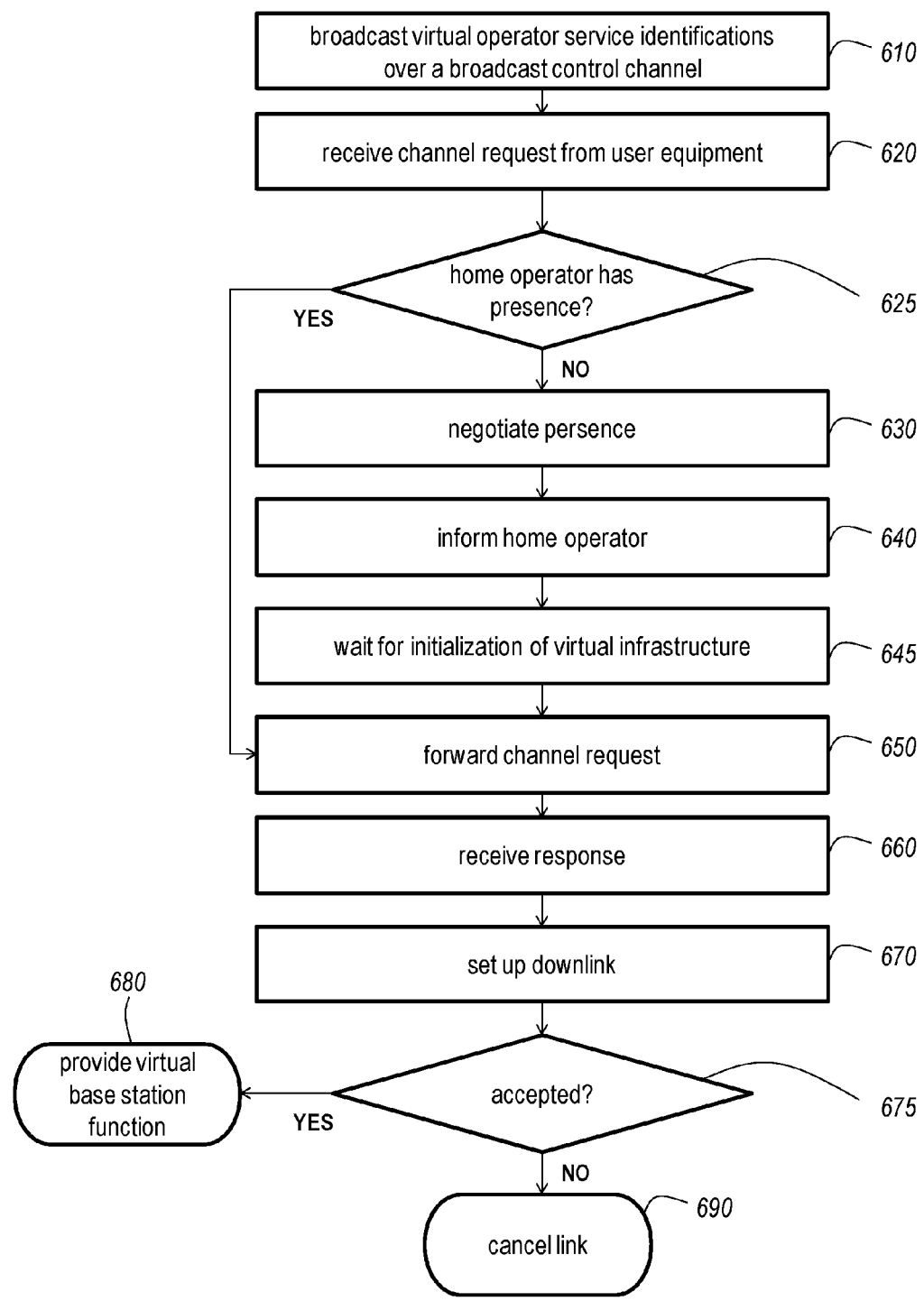
FIG. 6 is a flow chart representing another embodiment of the method of the present invention.

Some embodiments of the present invention provide base station virtualization without changing the relevant over-the-air standards (for 3GPP, the Uu interface). It is an advantage of these embodiments that they can be implemented by means of changes to the base station and the cellular core network exclusively, and that existing terminals (user equipment) can continue to be used unchanged. These embodiments will now be described in more detail with reference to FIG. 6.

It is an advantage of these embodiments of the invention that a RAN owner can virtualize its main asset, the base station, spectrum, and radio network controller and allow a home operator to provide its own virtual cellular service through the RAN owner.

Again, the basic structure is that when a roaming user sends its initial control message with an identifier associated with the home provider to sign onto the RAN owner's network, the RAN owner creates a virtual processing domain for the home operator using well-known processor virtualization techniques and enables the home operator to operate at the minimum its own protocol stack inside the RAN owner's equipment. According to embodiments of the present invention, the home operator provides interfaces that enable the home operator to interface directly with the underlying physical resources such as base-band coders and decoders, backhaul networking interfaces, and potentially even virtualized processing and storage resources.

The prime benefit of this approach is that it enables the home operator to provide differentiated services right to the base station. For instance, if the home operator distinguishes itself through its own scheduling techniques, preferential treatment of a certain group of its customers, service delivery to its customers, it can provide such differentiation right to the virtualized RAN. Moreover, a virtualized home operator can provide its own core networking interfaces, including but not limited to a completely virtualized cellular network that travels with its roaming users.

The present invention thus provides a mechanism by which a utility cellular provider can offer licensed spectrum to traditional service providers to provide coverage in unconventional locations such as supermarkets, department stores, townships, stadiums, etc when traditional service providers are not willing or cannot provide service in such areas because (a) they may not own spectrum in that locale, (b) it is prohibitively expensive to provide coverage in that area, or (c) it only needs to provide temporary service.

Below we describe an exemplary method by which this virtualization can be realized:

In a first step 610, a RAN owner broadcasts its Broadcast Control CHannel (BCCH), and a roamer connects to the base station/RNC by finding and decoding BCCH and sending a UL-DCCH-Request (Uplink Dedicated Control Channel) over the Reverse Access CHannel (RACH) to the RAN owner.

Embedded inside the UL-DCCH-Request, the roamer transmits its home network parameters to the RAN owner and the home operator is identified by the RAN owner on the basis of these home network parameters. These parameters can be the user equipment's temporary or full identifications (TMSI and/or IMSI). Thus, in the present embodiment, no specific adaptation of the user equipment is necessary to enable it to select a virtual network provider in accordance with the present invention. The UL-DCCH-Request is received by the RAN owner in a second step 620.

The RAN owner now verifies 625 whether the user equipment's "home" operator already has a presence on the RAN owner's network.

If this is not the case, the RAN owner negotiates with the home operator in a third step 630, to start a presence on the RAN owner's infrastructure. If both parties agree on the service arrangement, the RAN owner starts a new processing domain on the base station/RNC—i.e., RAN infrastructure—for the home operator. A domain can be a virtual machine (Xen, KVM, etc), a Secure Virtual Machine (SVM, for instance as disclosed in patent application EP 09165682.7 in the name of the present applicant, the content of which is incorporated by reference for this purpose,), a Solaris multi-tenant zone, or even a Java Virtual Machine (JVM). The virtual domain is started with a minimal environment to connect to the home operator, and to the underlying base-band hardware of the base station (e.g., direct through access via device drivers on the base station, or indirectly through existing Iub interfaces towards the wireless channel). Note that the domain is governed by appropriate real-time scheduling parameters to protect already executing domains from service disruptions.

In a fourth step 640, the base station/RNC—i.e., RAN—informs the home operator a virtual domain has been created for the operator and provides a network path to the home operator e.g. by informing the home operator the IP address of the domain's boot loader.

The RAN owner will then allow 645 the home operator to populate its RAN protocol processor (for UMTS at least RRC, PDCP, RLC and MAC, but may be also SGSN and GGSN) on its virtual domain in the base station/RNC—i.e., RAN. Note that the home operator can populate this in any form it likes and customization is key here—in addition to the virtual protocol stack, a service might include a PBX, SIP, CDN, or generally any service provider offered service required to provide virtual service to the roaming user equipment.

In a fifth step 650, the initial UL-DCCH-Request is forwarded from virtual domain for the home operator in the RAN owner's infrastructure to the newly created, or already existing virtualized protocol stack. If the earlier verification 625 revealed that the operator already had a presence on the RAN infrastructure, processing resumes at this fifth step 650.

The virtualized protocol stack handles the UL-DCCH-Request message, and negotiates with the home operator a downlink radio channel. Assuming both parties reach an agreement, the RAN owner provides a radio channel to the virtual domain by (a) controlling its base station's resources and provisioning the channel and (b) providing access to that channel to the virtual domain. The RAN owner receives the response to the UL-DCCH-Request message in a sixth step 660, which it relays in a seventh step 670, i.e., it allows the virtual operator to send a DL-DCCH message (Downlink Dedicated Control CHannel) over the RAN owner's FACH channel for delivery on the terminal;

On acceptance 675 by the terminal of the FACH message, the user equipment moves its logical channels to the newly created and virtualized channel, operated by the virtualized operator inside the base station. The base band coding for the channels themselves is performed through the RAN owner at stage 680. Conversely, if the FACH message is rejected by the terminal, the channel is not established 690.

In case the terminal relinquishes its channels, the allocated channels are returned to the RAN owner. If channels need more power, this can be negotiated with the RAN owner. If a virtual operator does not manage any channels anymore, it can remove its presence from RAN owner it was operating on by canceling its virtual presence.

As a piece of user equipment moves between base stations operated by the same RAN owner, the home (and virtualized) operator's cellular network relocates between base stations too, including all of its services.

A virtualized base station needs to treat IP address management differently when compared to current solutions. While before, explicit GTP or other types of tunnel are established between the base station, RAN and core network functions, with a virtualized base station a home operator can decide to connect the virtual instance of the protocol stack into its home network, again by tunnels, wherein the home operator can run all functions including some of the core functions such as the SGSN inside the virtualized base station. The home operator can also start a HA/GGSN/PDN on a (micro) data center close to the virtual base stations and implies local traffic remains local. The home operator can further include the HA/GGSN/PDN function inside the virtualized RAN itself.

The method described above provides the advantages of the present invention in a backward-compatible way. In other words, existing user equipment could connect to a home operator presence in a virtual base station without any changes in the operation of the user equipment. The user equipment will operate as if it is roaming, i.e. connecting to a radio network that does not belong to its home operator, while it will experience a level of service that is determined by the capabilities of the home operator's virtual presence at the base station, and not by those of the visited network. Typically, this level of service will be identical or close to the level of service offered when the user equipment is physically present in the home operator's radio network. To further enhance the "just like at home" experience, appropriate control messages may be transmitted from the home operator's virtual machine to the user equipment in order to change the operator identification string displayed at the user equipment from the visited network (which would normally be displayed) to the home network.

Although the invention has hereinabove been described with respect to an embodiment specifically targeted to the W-CDMA standard, this was done for illustrative purposes only and not to limit the scope of the invention in any way. The skilled person will appreciate that the principles of the invention, including the concept that the broadcast channel describes which virtual operators are supported through the virtualized base station, may also be applied to other mobile technologies, in particular CDMA2000, GSM/GPRS, WiMAX, and LTE, by making the appropriate substitutions for the recited procedures.

The various methods embodying the present invention have been described and/or illustrated as a sequence of steps, the order of which is purely exemplary, unless it is clear from the description that a particular step cannot take place until another step has been completed.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for providing access to a mobile communication network comprising at least one base transceiver station, wherein said at least one base transceiver station comprising a computation platform adapted to host a plurality of virtual machines, each of which is dedicated to a virtualized home operator, and said virtual machines being operatively connected to communication functions provided by said at least one base transceiver station, said communication network being visited by a user equipment having a home operator in a home network, the method comprising at said at least one base transceiver station:

broadcasting over a broadcast control channel a plurality of identifications of virtual operator services provided by respective virtual operator service providers, and connection instructions pertaining to said virtual operator services;

receiving a channel request from said user equipment, wherein said channel request pertains to a selected one of said virtual operator service providers corresponding to said home operator of said user equipment;

verifying if a virtual machine instance corresponding to the selected virtual operator service is present on said computation platform;

instantiating a virtual machine instance if the result of said verifying is negative;

allocating base station resources to said virtual machine instance;

creating a virtual machine associated with said home operator of said user equipment;

establishing a channel using said virtual machine; and allocating channel resources of said at least one base station to accommodate said channel; and exchanging communication data with said home operator and exchanging wireless transmissions comprising said communication data with said user equipment;

wherein said allocating of channel resources and said exchanging communication data takes place through said virtual machine instance, using resources from among said allocated base station resources.

2. The method of claim 1, wherein said allocating channel resources comprises at said at least one base transceiver station:

relaying said channel request to said home operator; and—
receiving a resource request from said home operator.

3. The method of claim 2, wherein said allocating channel resources comprises at said at least one base transceiver station:

verifying if sufficient resources are available at said at least one base transceiver station to accommodate said resource request; and allocating resources in accordance with said resource request if said sufficient resources are available.

4. The method of claim 1, further comprising at said at least one base station: broadcasting primary and secondary common pilot channels, a primary common control physical channel, and a synchronization channel.

5. The method of claim 1, wherein said request comprises an uplink dedicated control channel message, received over a Reverse Access Channel.

6. A base station system for providing access to a mobile communication network, said base station system comprising:

a broadcast control channel transmission unit adapted to broadcast a plurality of identifications of virtual operator services provided by respective virtual operator service providers, and connection instructions pertaining to said virtual operator services, over a common control channel;

a receiving unit adapted to receive a channel request from a user equipment to establish a channel, wherein said channel request comprises an identification of said selected virtual operator service from among said virtual operator services;

a resource allocating module adapted to allocate channel resources of said base station to a selected virtual operator service to accommodate said channel;

a service provider interface adapted to exchange communication data with said selected virtual operator service;

an air interface adapted to exchange wireless transmissions comprising said communication data with said user equipment; and a computing platform adapted to instantiate a plurality of virtual machines;

wherein said resources comprise resources of a virtual machine instance instantiated in said computing platform, said virtual machine instance being associated with said selected virtual operator service;

wherein the resource allocation module is further adapted to allocate base station resources to said virtual machine instance;

wherein said allocating of channel resources and said exchanging communication data takes place through said virtual machine instance using resources from among said allocated base station resources.

7. The base station system of claim 6, wherein said channel request comprises a user equipment identification, and wherein said base station system is adapted to select said selected virtual operator service on the basis of said user equipment identification.

8. The base station system of claim 6, further comprising a resource negotiation agent, adapted to relay said channel request to the virtual operator service provider corresponding to said selected virtual operator service and to receive a resource request from said virtual operator service provider.

* * * * *